US011223697B2

(12) United States Patent
Carofiglio et al.

(10) Patent No.: US 11,223,697 B2
(45) Date of Patent: Jan. 11, 2022

(54) SCALING MICROSERVICES COMMUNICATION OVER INFORMATION CENTRIC NETWORKS

(71) Applicant: Cisco Technology, Inc., San Jose, CA (US)

(72) Inventors: Giovanna Carofiglio, Paris (FR); Luca Muscariello, Paris (FR); Mauro Sardara, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 77 days.

(21) Appl. No.: 16/384,110

(22) Filed: Apr. 15, 2019

(65) Prior Publication Data

US 2020/0329113 A1    Oct. 15, 2020

(51) Int. Cl.
*H04L 29/08* (2006.01)
*H04L 29/06* (2006.01)

(52) U.S. Cl.
CPC .......... *H04L 67/2833* (2013.01); *H04L 67/20* (2013.01); *H04L 69/14* (2013.01)

(58) Field of Classification Search
CPC . H04L 67/2842; H04L 45/306; H04L 67/327; H04L 65/403
See application file for complete search history.

(56) References Cited

U.S. PATENT DOCUMENTS

| | | | |
|---|---|---|---|
| 8,694,675 B2 | 4/2014 | Wang et al. | |
| 9,503,358 B2 | 11/2016 | Garcia-Luna-Aceves | |
| 9,661,098 B2 | 5/2017 | Kim et al. | |
| 9,781,061 B2 | 10/2017 | Kutscher et al. | |
| 9,942,831 B2 | 4/2018 | Laraqui et al. | |
| 2013/0060962 A1* | 3/2013 | Wang | H04L 67/327 709/238 |
| 2014/0222891 A1* | 8/2014 | Ko | H04L 67/1097 709/203 |
| 2014/0310375 A1* | 10/2014 | Jeon | H04L 67/2814 709/217 |
| 2018/0145927 A1* | 5/2018 | Srikanteswara | H04L 45/04 |
| 2018/0324091 A1* | 11/2018 | Dong | H04L 45/54 |

\* cited by examiner

*Primary Examiner* — Joe Chacko
(74) *Attorney, Agent, or Firm* — Polsinelli PC (57) ABSTRACT

Content can be delivered by a producer service to one or more consumer services over an information centric network ("ICN") by storing application frames in a forwarding cache of an ICN node. The consumer services may retrieve applications frames from the ICN node rather than from the producer service directly.

17 Claims, 9 Drawing Sheets

SCALING MICROSERVICES COMMUNICATION OVER INFORMATION CENTRIC NETWORKS

FIELD

The present invention generally relates to network management. In particular, the present invention relates to serving data over information centric networks.

BACKGROUND

Many applications make use of unicast and connection-oriented transport protocols. For example, in a distributed microservices environment, interaction models and features such as request-reply and session resumption over a new transport connection utilize unicast connections between data producing services ("producer") and data respective consuming services ("consumers"). However, where a microservice must communicate in a many-to-many manner, such as in a publish-subscribe pattern, one unicast connection must be made between a producer and each respective consumer. Third-party processes, such as message brokers, can offload management of these unicast connections, however the third-party services must still utilize resources and processing power to manage each unicast connection. In effect, third party-processes move the same protocol of managing multiple unicast connections downstream to a dedicated platform.

It is with these observations in mind, among others, that aspects of the present disclosure were concerned and developed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompany drawings in which.

DESCRIPTION OF EXAMPLE EMBODIMENTS

Various embodiments of the disclosure are discussed in detail below. While specific representations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain cases, well-known or conventional details are not described in order to avoid obscuring the description. References to one or more embodiments in the present disclosure can be references to the same embodiment or any embodiment; and, such references mean at least one of the embodiments.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatuses, methods, and their related results according to the embodiments of the present disclosure are given below. Note that titles or subtitles may be used in the examples for convenience of a read, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure can be realized and obtained by means of the instruments and combinations particularly pointed out in the appended claims. These and other features of the disclosure will be become fully apparent from the following description and appended claims, or can be learned by the practice of the principles set forth herein.

Overview

A hybrid information centric network ("hICN") transport protocol can be receiver-driven and content-aware to reduce the number of processes (e.g., producer-consumer connections) managed by a producer. In effect, the transport protocol can enable a hICN multicast pull-based channel between a producer and multiple consumers. As a result, multicasting can be performed asynchronously. Further, consumers may avoid flooding issues by requesting frames from respective producers as needed and so mitigate various backpressure issues in streaming data processes.

In one example, consumer services send respective production requests to a producer service over an information centric network ("ICN"). The producer service produces information according to the production requests and publishes that produced information to a forwarding cache of a node in the ICN. The consumer services then each respectively retrieve the published information from the node. As a result, the consumer services may retrieve the published information at different respective rates and the producer service need not maintain separate connections for serving information directly to each respective consumer service.

Example Embodiments

In some examples, services (e.g., microservices) may be associated with a unique identifier such as, for example and without imputing limitation, a name prefix. A producer service publishes application frames (e.g., content requested by one or more consumer services) to a local node in an ICN over a hICN protocol. The local node may then store the published application frames in a respective local forwarder cache for retrieval by consumer service via pull-based interest-data exchange over the hICN protocol.

In particular, the producer is able to serve multiple consumers without forming a one-to-one connection with each particular consuming service. The local node, hICN routers within the ICN, manage serving data from the producer to respective consumers in the network. The consumers may retrieve content from the local node through a pull-based retrieval such as by sending interest packets for relevant application frames to the local node. In some examples, the local node can serve the consumers using native hICN multicasting based on respective packet caches for each router.

A service subscription may be established to create a relationship between a publisher and one or more consumers. For example, a service subscriptions is established where a producer service generates data which may be consumed by multiple consumer services such as for timing or logging purposes and the like.

In particular, a consumer service can send a control interest message to a producer service over a shared ICN. The control interest message can include configuration information as well as a consumer service identifier. In some examples, the configuration information may be an RSocket SETUP frame declaring the consumer subscription to the producer and/or the consumer service identifier may be according to hICN protocol and belong to a namespace.

The consumer service identifier may be used by the producer service to send notify the consumer service that new application frames (e.g., RSocket frames) are available for retrieval. For example, the producer service may maintain a list of consumer services to notify when new applications frames are available for retrieval.

In response, the producer service can send an acknowledgement to each respective consumer service. In some examples, the producer service may also send a producer service identifier (e.g., according to hICN protocol), which each respective consumer service may use to send notifications to the producer service. Further, in addition, or instead, an error message may be returned to the consumers such as when a producer is unable to produce the requested content (e.g., due to functionality, online/offline status, etc.).

As a result, the producer service may publish (e.g., send) application frames to a nearby node within the ICN, where the application frames may be stored in a forwarding cache of the nearby node. As used herein, "nearby" is used in a network topological sense and it is understood that the nearby node may be geographically distant, for example, while still being topologically nearby the producer service in respect to the ICN. Additionally, while discussed herein for the sake of explanation as a single nearby node, it will be understood by a person having ordinary skill in the art and in light of this disclosure that application frames, as with any content, may be stored across multiple forwarding caches of multiple nodes in the ICN according to a respective ICN content caching policy. In effect, and at an abstracted level, the ICN as a whole may cache information in one or more forwarding caches.

The producer service may notify relevant consumer services of the availability of new application frames based on, for example and without imputing limitation, the provided consumer service identifiers. The consumer services can then retrieve the application frames stored in the forwarding cache via ICN interest-data exchange such as name-based content retrieval and the like.

An additional consumer service(s) may subscribe to the producer service by sending a respective additional consumer identifier, which the producer may add to the list of consumers to be notified. As a result, consumers can avoid creating a new connection directly to the producer through which to receive subscribed data.

Each application frame produced by the producer service may be associated with a unique identifier according to the hICN protocol. For example, the unique identifier may be based on a stream identifier (e.g., a producer-consumer(s) relationship or subscription) and a frame number within the stream identifier. The unique identifier may be a combination of a producer service identifier in the form of a service prefix and a hash of a concatenation of the stream identifier and frame number.

As an explanatory example, and without imputing limitation, assume a stream identifier is "2" and a frame number is "3". Further, assume a producer service identifier service prefix is "b001:beef:1234:00::/112". As a result, a unique identifier for a respective application frame may be "b001:beef:1234:0::d0d0".

Various interactions between producer and consumer services may be performed based on the discussion above. A request-reply interaction can include a consumer service publishing a content request into a forwarding cache of a node in an ICN. The consumer service may then send a consumer notification to a producer service in the ICN that the content request is available at the node. The consumer notification may include response information (e.g., consumer identifier, etc.) for the producer service.

In response, the producing service may pull (e.g., retrieve) the content request from the node and publish content to the same node in the ICN or a different node in the ICN, to be stored in a respective forwarding cache. In some examples, the published content may be based on information included in the content request (e.g., parameters, etc.). The producer service may then notify the consumer service (e.g., a subscriber) of the cached content. The consumer then retrieves the cached content in a multicast fashion. In particular, multicast fashion includes name-based routing protocols for retrieving information stored over an ICN in which a router may receive an information request and either forward to an appropriate next hop, or return locally cached information matching the request, as will be apparent to a person having ordinary skill in the art in light of this disclosure.

In the case of streaming data, substantially the same methodology as above can be used. However, the producer service may notify the consumer service of each cached frame of a respective stream. As a result, the consumer service may retrieve each cached frame according to the current load and demand of the respective consumer service and so avoid flooding issues.

In some examples, the producer service can publish content independent of a content request from a consumer service. The producer may notify any subscribed consumer services of the availability of the published content and consumer services may determine to retrieve the published content based on internal respective processes without notice sent to the producer service.

Figure 1:
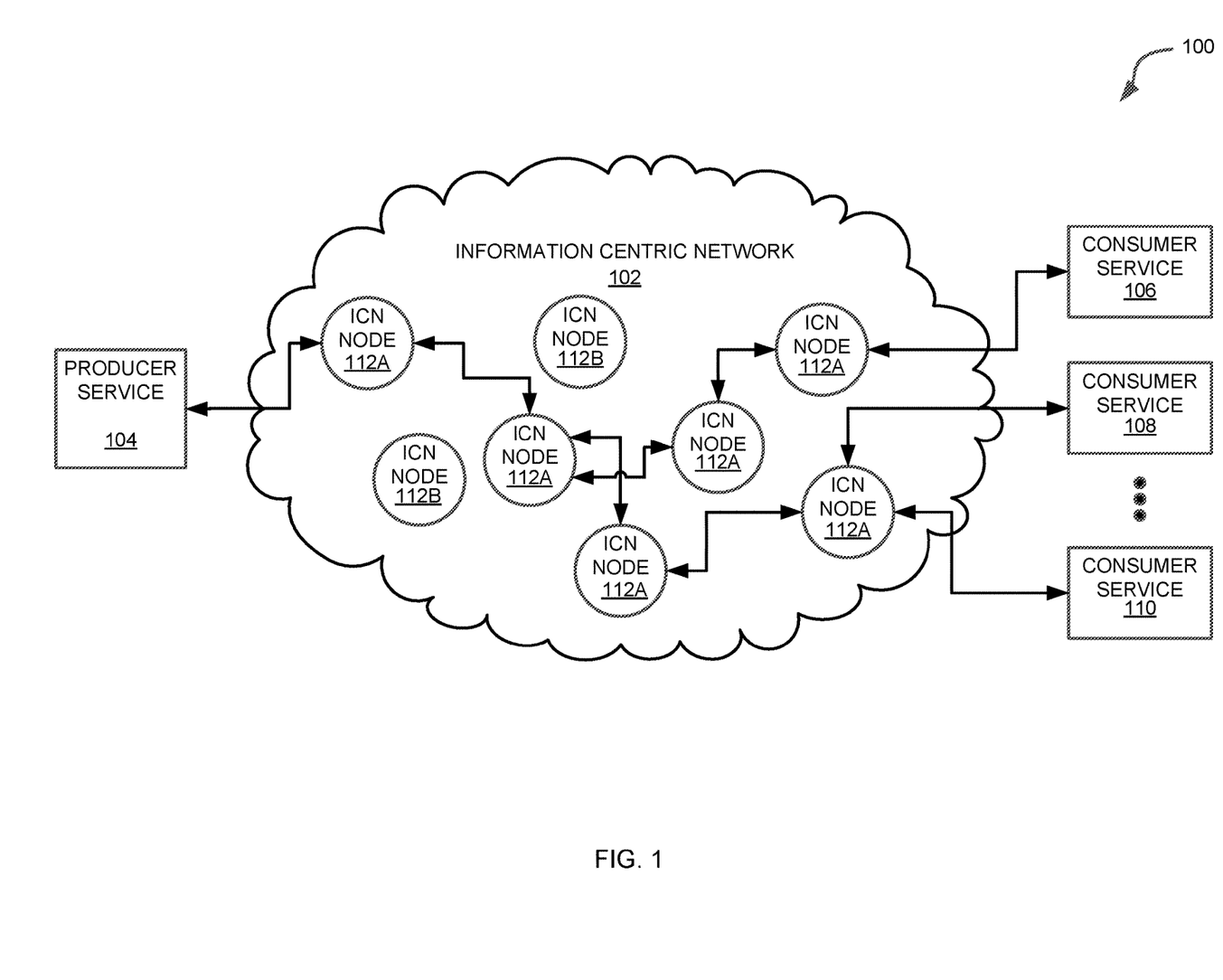
FIG. 1 illustrates an example environment for transmitting data over an information centric network, according to various embodiments of the subject technology.

FIG. 1 depicts an example of an information centric network environment 100 over which content can be delivered between services. While a single information centric network 102 is depicted for explanatory purposes, information centric network environment 100 can include multiple networks, virtual networks, local area networks ("LANs"), wide-area networks ("WANs"), and the like as will be understood by a person having ordinary skill in the art in light of this disclosure.

A producer service 104 and multiple consumer services 106-110 may exchange information over information centric network 102. In some examples, producer service 104 may be a data feed such as, for example and without imputing limitation, a GPS unit. Consumer services 106-110 may be individual services, microservices in a mesh, or some combination. For example, consumer services 106-110 may each be microservice gateways for respective software or services receiving streaming location data from the GPS unit.

When information passes between producer service 104 and any of consumer services 106-110 over information centric network 102, the information may be directed through the network via name-based routing. Based on the destination name, packets of information are relayed via ICN nodes 112A, while nodes 112B are not part of any route between producer service 104 and consumer services 106-110, but may relay other information between other entities connected over information centric network 102.

Further, ICN nodes 112A-B may store content in respective content caches, or local memory, for serving to new requests for the same content. For example, where producer service 104 serves content to consumer service 106, one or more of ICN nodes 112A may store a copy of the served content in the respective content cache of the node. When consumer service 108 later sends a request for the same content, the one or more of ICN nodes 112A that had stored a copy of the content may serve the respective content to consumer service 108 based on name information (e.g., name or other identifier of producer service 104, etc.) and other request information included in the content request.

Figure 2:
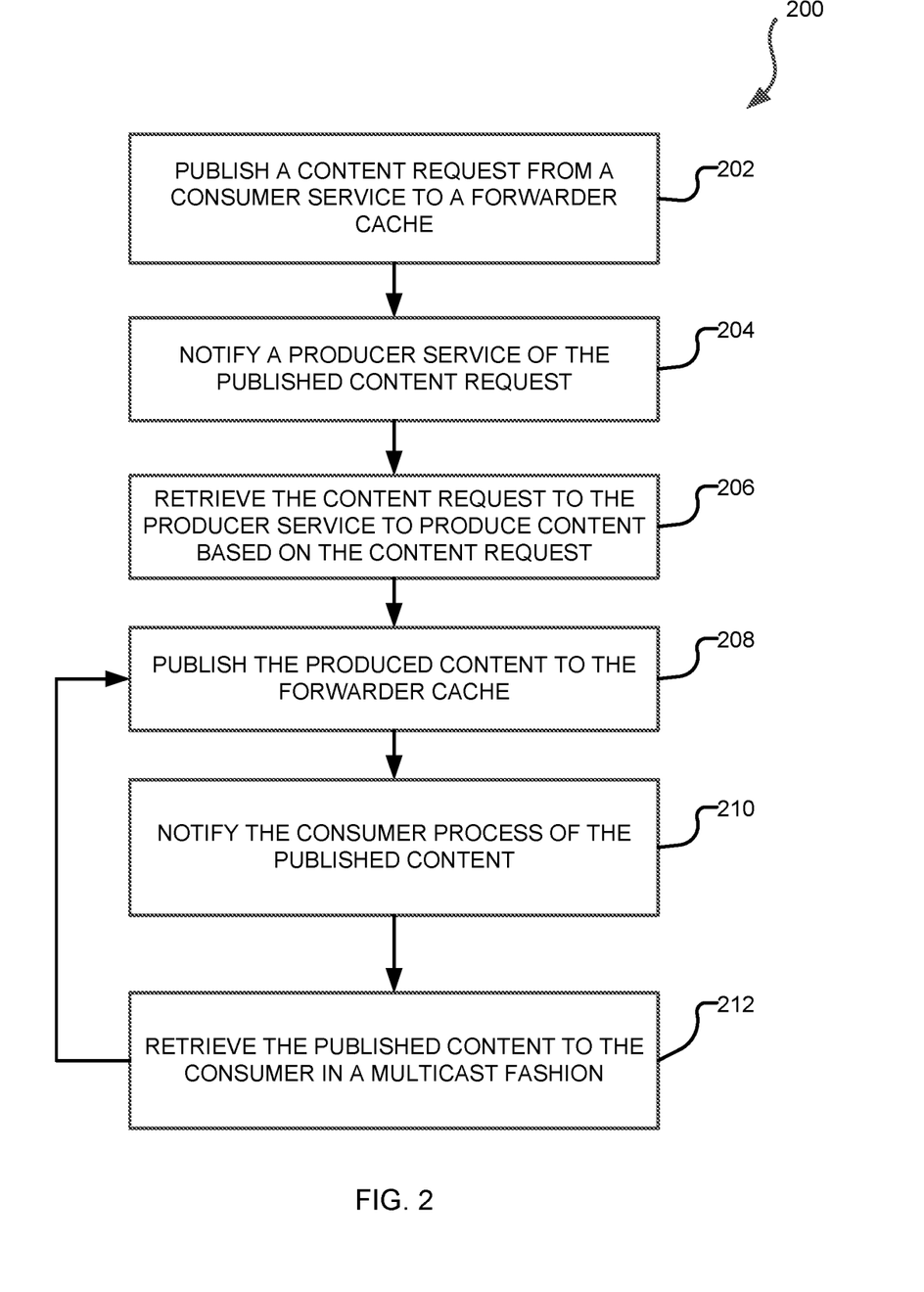
FIG. 2 illustrates a flowchart of an example method for serving information over an information centric network, according to various embodiments of the subject technology.

FIG. 2 depicts a method 200 for serving content over an information centric network such as that discussed in regards to FIG. 1 above. At step 202, a consumer service publishes a content request to a forwarder cache of, for example, one of ICN nodes 112A. The particular forwarder cache to which the content request is published may be determined based on routing and storage algorithms of the underlying ICN. For example, in some ICNs, a nearby (e.g., topologically nearby within the underlying network) node may store the content request. In some examples, the content request may be stored in a node nearest an intended recipient (e.g., a destination) of the content request.

Nevertheless, at step 204, a producer service is notified of the published content request. In some examples, the notification for the producer service is sent as part of the content request publication. In some examples, both notice and request messages are distinct messages sent sequentially through the network.

At step 206, the producer service retrieves the content request in response to receiving notice from the consumer service and produces content based on the content request. For example, the content request may include parameters useful to producing the requested content. In some examples, the content request may include validation or authorization information informing the producer that the consumer is allowed to receive the requested content.

At step 208, the produced content is published to the forwarder cache. While a single forwarder cache is discussed in reference to method 200, it is understood that different forwarder caches and multiple forwarder caches may receive published requests and content. Content published to the content forwarder cache may be available for retrieval.

At step 210, the consumer process is notified of the published content. The consumer process may process the notice according to respective internal algorithms and processes. For example, the consumer process may include one or more content queuing protocols, such as a load balancing process or the like, and may accordingly determine a certain amount of time to delay retrieving the published content, etc.

At step 212, the published content is retrieved to the consumer process in a multicast fashion. For example, the consumer process may broadcast a content interest to the ICN and, upon the content interest being received by a node including the forwarding cache to which the content was published, the content may be returned back to the consumer process. As a result, the consumer process need not particularly identify the producer service or the like. Further, in cases of streaming data (e.g., a GPS stream provided to multiple consumer services), method 200 may loop back to step 208 as needed. In particular, the producer service may publish additional content (e.g., further sequential frames of a stream) to the forwarder cache and notify the consumer service(s) of the published content, which may retrieve the additional published content in a multicast fashion.

FIGS. 3A-E are sequential system diagrams of a producer-consumer information exchange. In particular, a producer 302 produces content for consumers 306-308. A hICN forwarder 304 forwards information (e.g., data packets including interests, notifications, etc.) between producer 302 and consumers 306-308 over an ICN, such as information centric network 102 discussed above.

Consumers 306-308 may be associated with respective identifying information. For example, consumer 306 may be associated with a prefix "b001:beef:1234:1::/112", consumer 307 may be associated with a prefix "b001:beef:1234:2::/112", and consumer 308 may be associated with a prefix "b001:beef:1234:3::/112". Likewise, producer 302 may be associated with a prefix "b001:beef:1234:0::/112". The respective prefixes may be used to forward packets to each service (producer 302 or consumers 306-308) according to forwarding information stored in a forwarding information base ("FIB") of hICN forwarder 304.

Figure 3A:
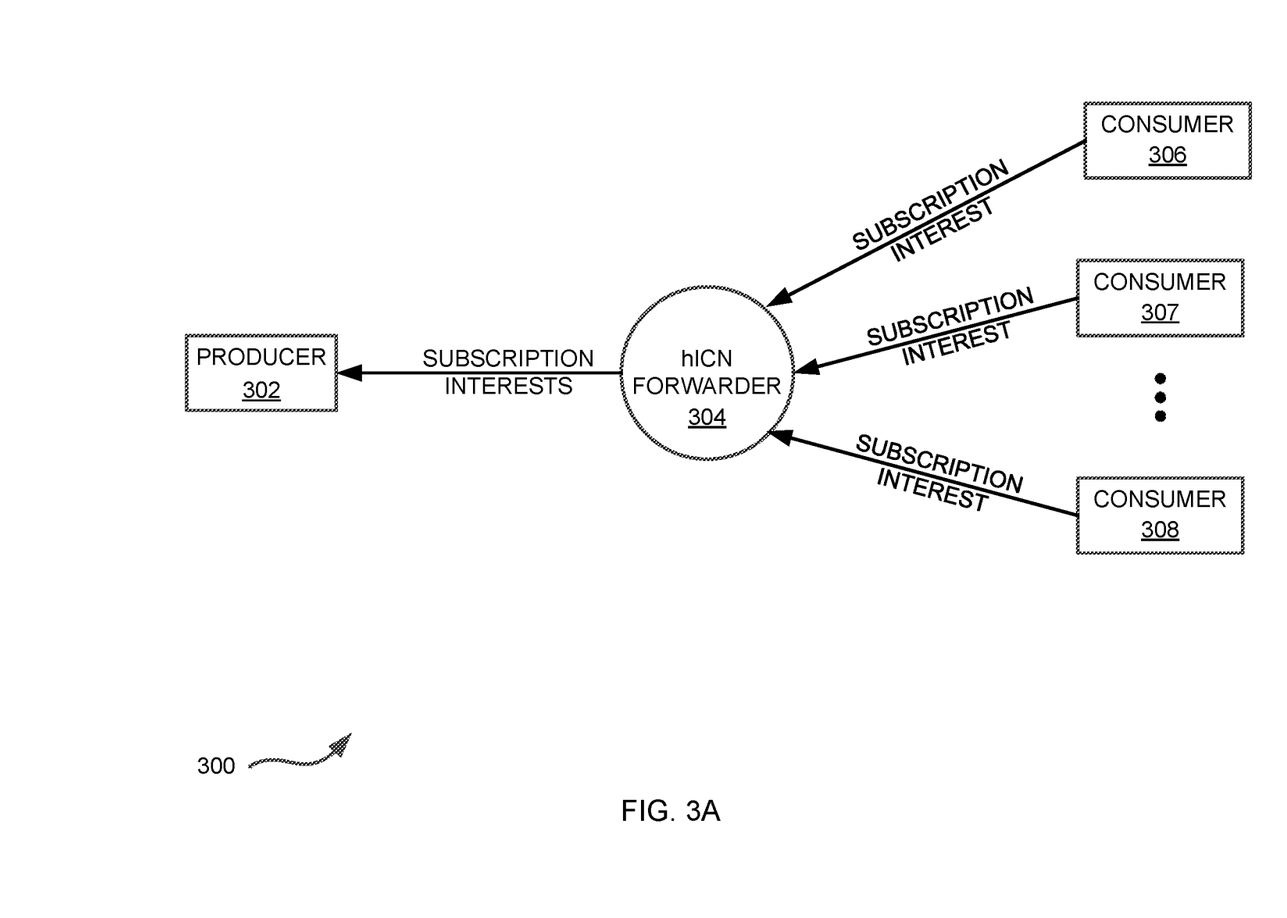
FIGS. 3A-E illustrate an example system and sequence for serving information over an information centric network, according to various embodiments of the subject technology.

In FIG. 3A, consumers 306-308 send subscription interests to hICN forwarder 304. In turn, hICN forwarder 304 forwards the subscription interests to producer 302. In some examples, each subscription interest includes a production service request command for producer 302 and the respective associated prefix of each requesting consumer 306-308. As a result, producer 302 may use the associated prefixes for sending notifications to consumers 306-308 when new content (e.g., application frames) are available for retrieval.

Figure 3B:
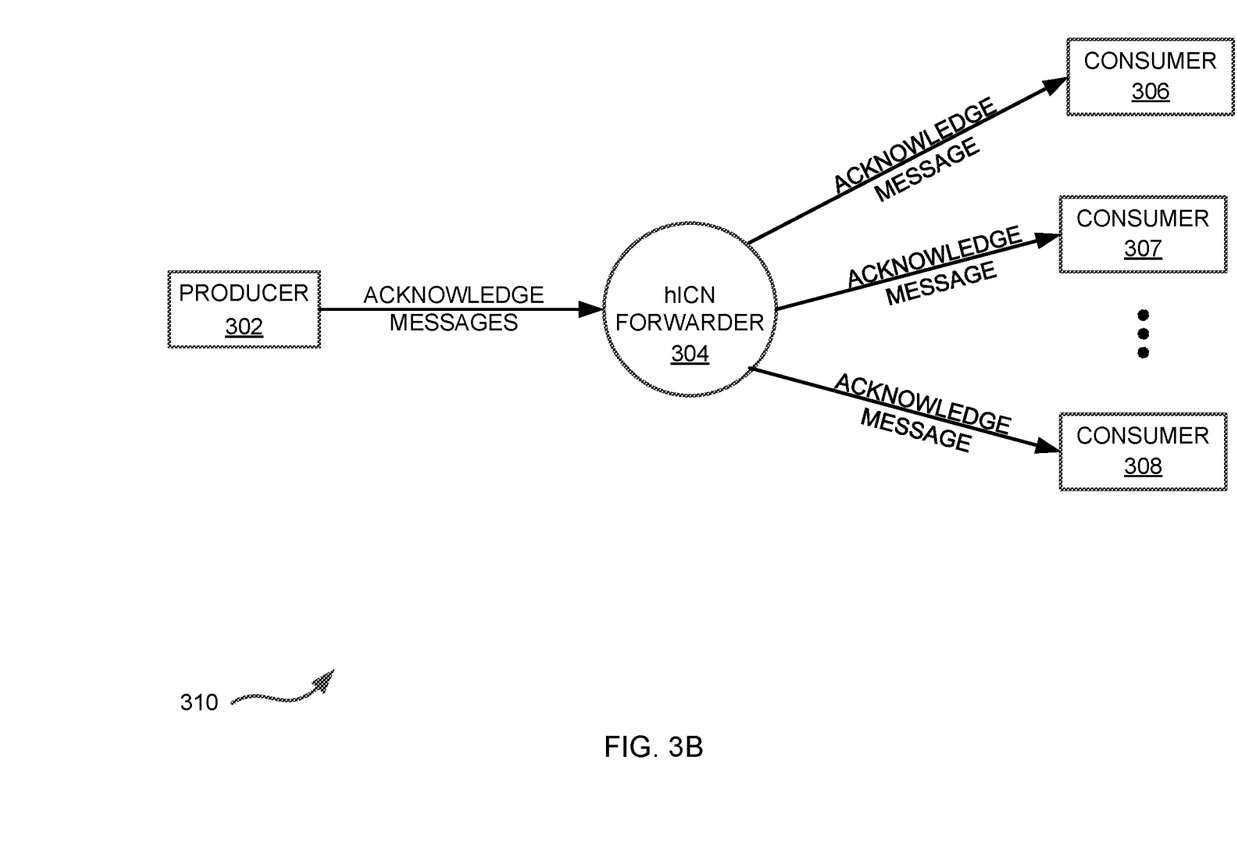

In FIG. 3B, hICN forwarder responses to the subscription interests with respective acknowledgement messages. The acknowledgement messages may be provided to hICN forwarder 304 and include the associated prefix as a destination. In some examples, each acknowledgement message may include a notice count by which receiving consumers 306-308 may keep track of which application frames have yet to be requested. For example, the acknowledgement message may include the associated prefix of producer 302 concatenated to an initial value such as "b001:beef:1234:0::0001" or the like.

Figure 3C:
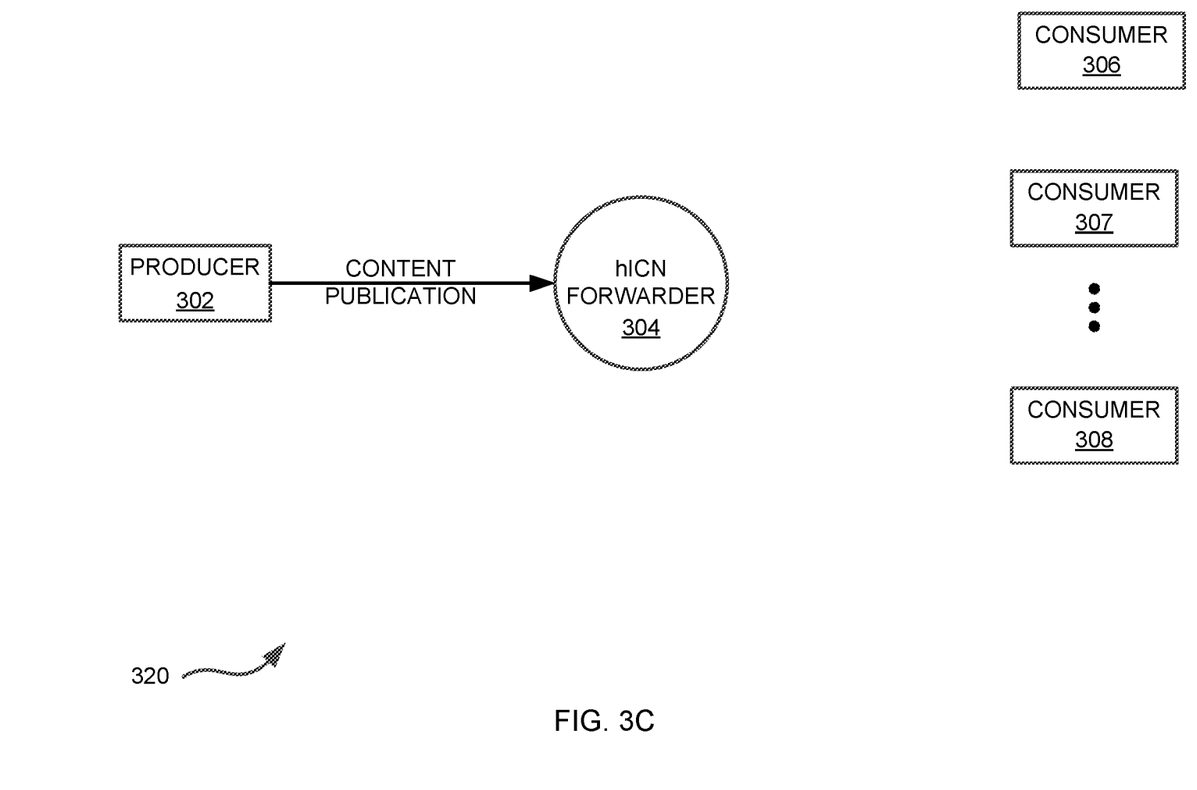

In FIG. 3C, producer 302 publishes content to hICN forwarder 304. In some examples, the published content is named based on a stream identifier and a frame (e.g., of the stream) identifier. For example, the published content may be named "b001:beef:1234:0:d0d0" which concatenates the prefix associated with producer 302 to a hash of a stream identification "2" and an application frame identification "3".

Figure 3D:
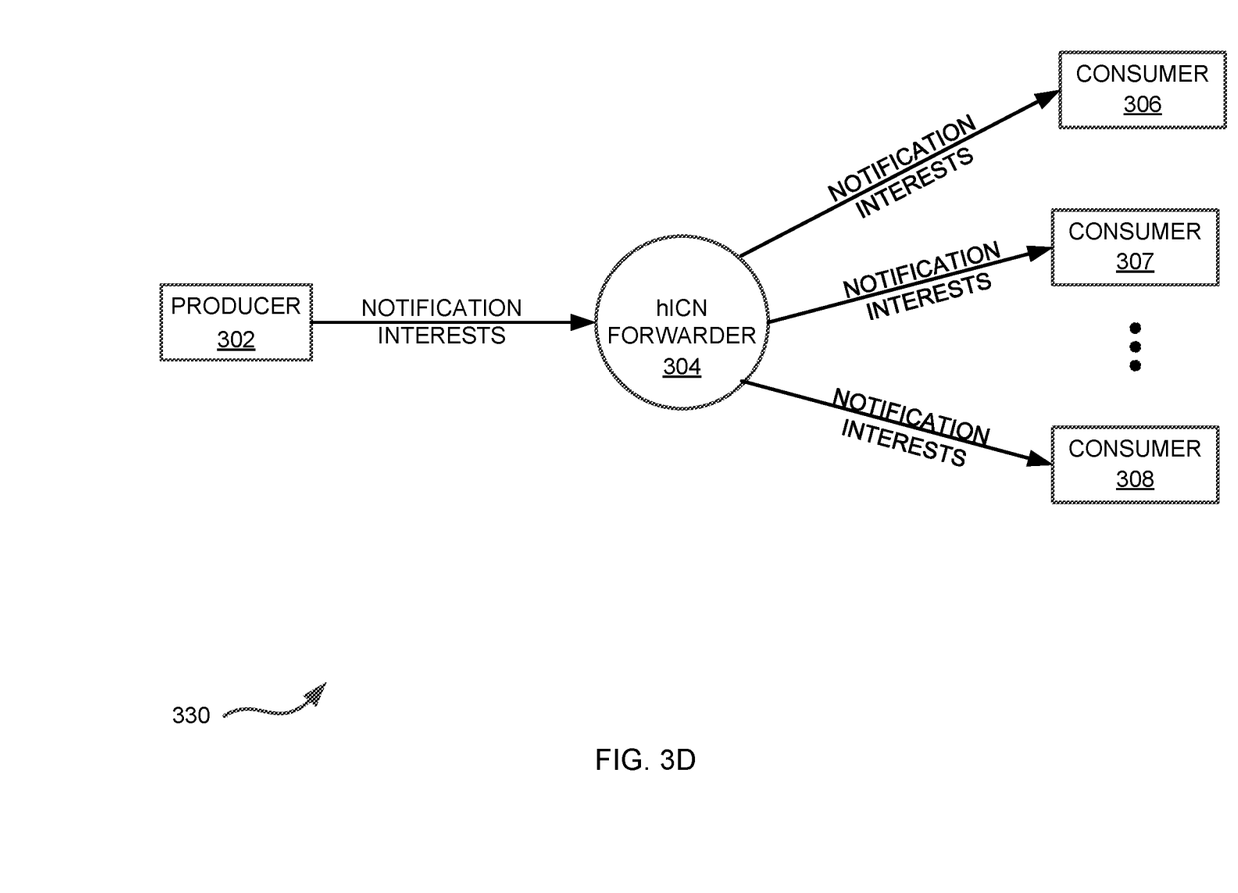

In FIG. 3D, producer 302 sends notification interests to consumers 306-308 via hICN forwarder 304. The notification interests may include respective consumer service names as an interest destination address. In some examples, the notification interests include the published content name, which consumers 306-308 may use to retrieve the published content from hICN forwarder 304.

Figure 3E:
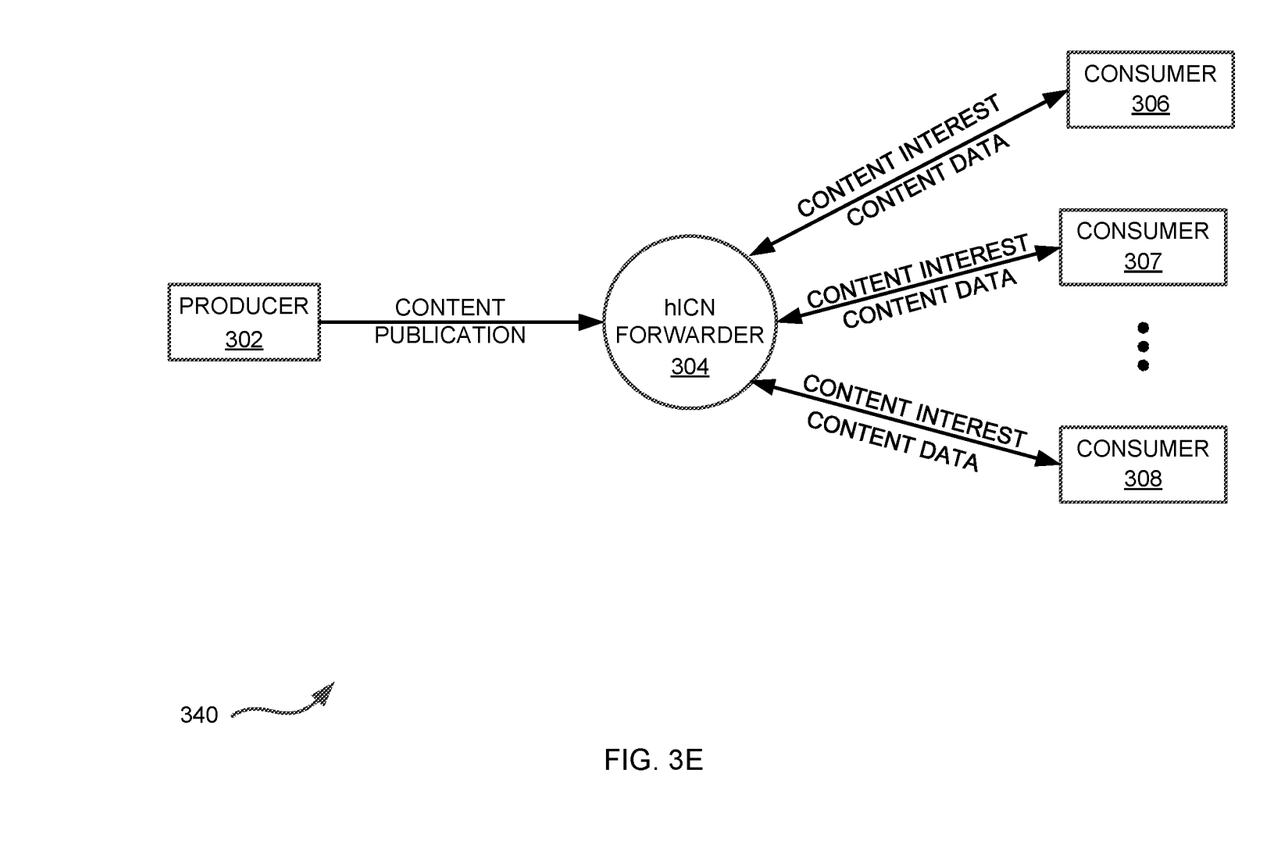

In FIG. 3E, consumers 305-308 retrieve the published content from hICN forwarder 304 by sending respective content interests to the ICN. The content interests may include the name provided with the received notification interests. Further, producer 302 may publish additional content to hICN forwarder 304 for retrieval by consumers 306-308 or new consumers (not depicted) later subscribing to producer 302.

Figure 4:
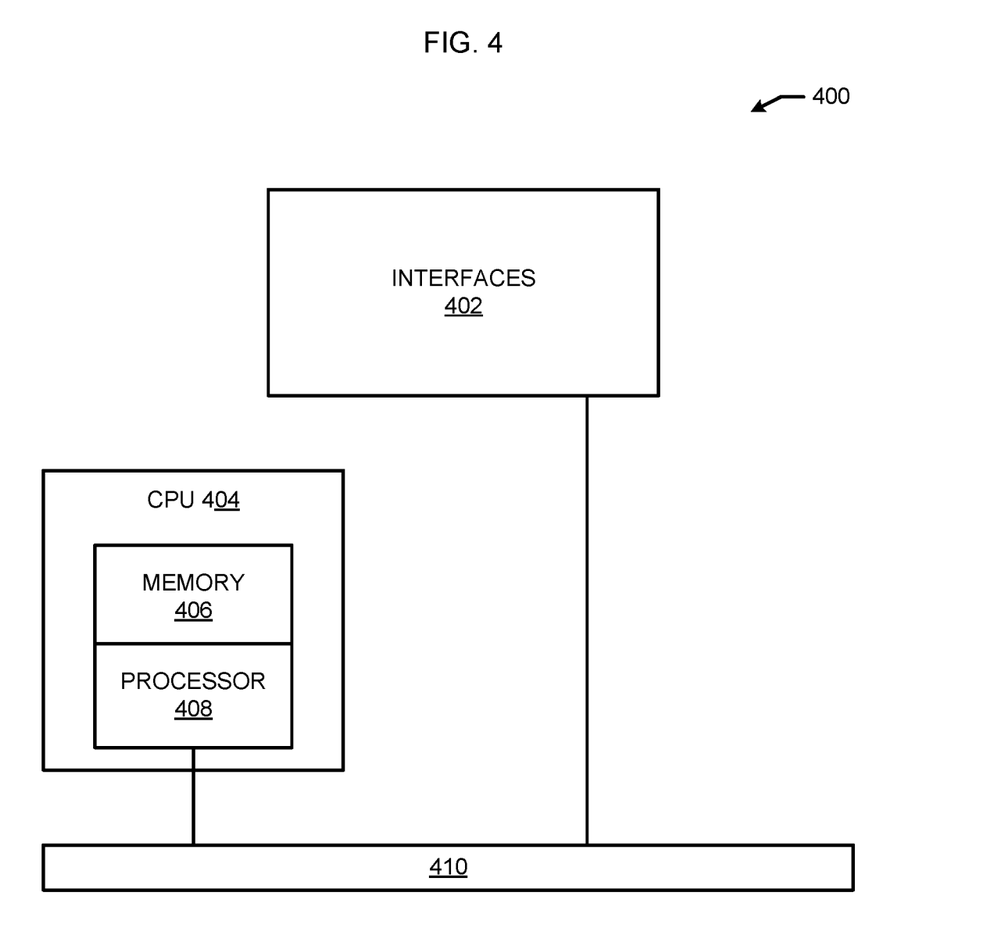
FIG. 4 illustrates an example network device, according to various embodiments of the subject technology.

Although the system shown in FIG. 4 is one specific network device of the present disclosure, it is by no means the only network device architecture on which the concepts herein can be implemented. For example, an architecture having a single processor 408 that handles communications as well as routing computations, etc., can be used. Further, other types of interfaces and media could also be used with the network device 400.

Regardless of the network device's configuration, it may employ a CPU 404 and one or more memories or memory modules (including memory 406) configured to store program instructions for the general-purpose network operations and mechanisms for functions described herein to be executed by processor 408. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC), which can be configured to perform routing, switching, and/or other operations. The ASIC can communicate with other components in the network device 400 via the connection 410, to exchange data and signals and coordinate various types of operations by the network device 400, such as routing, switching, and/or data storage operations, for example.

Figure 5:
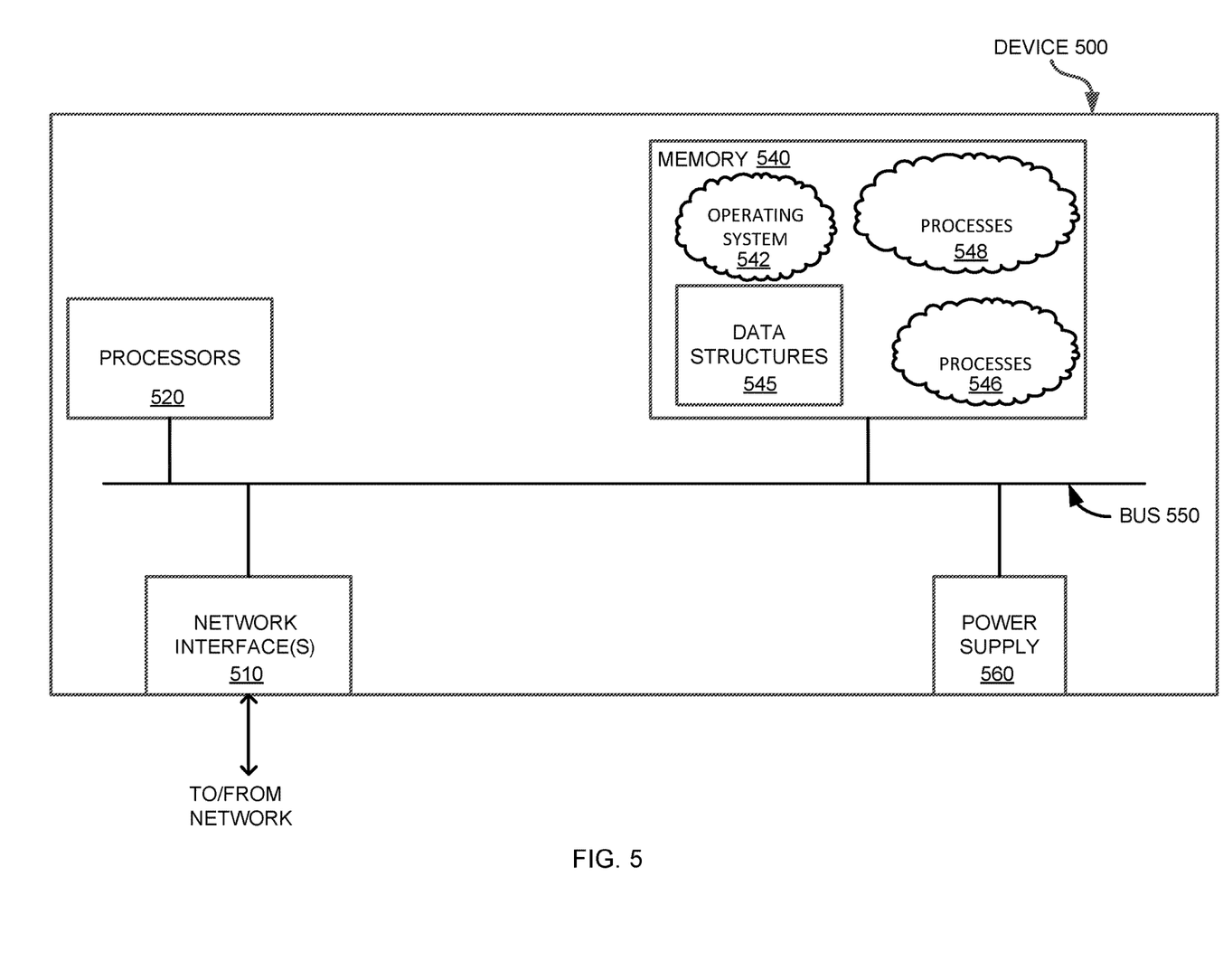
FIG. 5 illustrates an example computing device, according to various embodiments of the subject technology.

FIG. 5 is a schematic block diagram of an example computing device 500 that may be used with one or more embodiments described herein e.g., as any of the discussed above or to perform any of the methods discussed above, and particularly as specific devices as described further below. The device may comprise one or more network interfaces 510 (e.g., wired, wireless, etc.), at least one processor 520, and a memory 540 interconnected by a system bus 550, as well as a power supply 560 (e.g., battery, plug-in, etc.).

Network interface(s) 510 contain the mechanical, electrical, and signaling circuitry for communicating data over links coupled to a network, e.g., providing a data connection between device 500 and the data network, such as the Internet. The network interfaces may be configured to transmit and/or receive data using a variety of different communication protocols. For example, interfaces 510 may include wired transceivers, wireless transceivers, cellular transceivers, or the like, each to allow device 500 to communicate information to and from a remote computing device or server over an appropriate network. The same network interfaces 510 also allow communities of multiple devices 500 to interconnect among themselves, either peer-to-peer, or up and down a hierarchy. Note, further, that the nodes may have two different types of network connections 510, e.g., wireless and wired/physical connections, and that the view herein is merely for illustration. Also, while the network interface 510 is shown separately from power supply 560, for devices using powerline communication (PLC) or Power over Ethernet (PoE), the network interface 510 may communicate through the power supply 560, or may be an integral component of the power supply.

Memory 540 comprises a plurality of storage locations that are addressable by the processor 520 and the network interfaces 510 for storing software programs and data structures associated with the embodiments described herein. The processor 520 may comprise hardware elements or hardware logic adapted to execute the software programs and manipulate the data structures 545. An operating system 542, portions of which are typically resident in memory 540 and executed by the processor, functionally organizes the device by, among other things, invoking operations in support of software processes and/or services executing on the device. These software processes and/or services may comprise one or more interest processes 546 which, on certain devices, may be used by an illustrative content process 548, as described herein. Notably, interest processes 546 may be stored and/or retrieved for storage by processor(s) 520 via, for example, network interface(s) 510 or other processes according to the configuration of device 500.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Statements follow describing various aspects of the subject technology:

Statement 1: A method for serving data over an information centric network ("ICN") includes receiving a content production request from a consumer service, forwarding the content production request to a producer service, receiving published content produced by the producer service, storing the published content in a forwarding cache of a node within an ICN, receiving a content retrieval request from the consumer service, and forwarding a copy of the stored published content to the consumer service.

Statement 2: A method according to Statement 1 further includes forwarding an acknowledgement message from the producer service to the consumer service.

Statement 3: A method of according to any of the preceding Statements further includes storing the content production request in the forwarding cache of the node, receiving a request notification message from consumer service, and forwarding the request notification message to the producer service, wherein the content production request is forwarded to the producer service in response to a request from the producer service.

Statement 4: A method according to any of the preceding Statements further includes receiving a content availability notice from the producer service, and forwarding the content availability notice to the consumer service.

Statement 5: A method according to any of the preceding Statements further includes receiving additional content production requests from one or more additional consumer services and forwarding additional copies of the stored published content to the one or more additional consumer services.

Statement 6: A method according to any of the preceding Statements includes the published content including an application frame number.

Statement 7: A method according to any of the preceding Statements includes one of the consumer service or the producer service being a microservice within an application.

Statement 8: A system for serving data over an information centric network ("ICN") includes one or more processors, and a memory comprising instructions to receive a content production request from a consumer service, forward the content production request to a producer service, receive published content produced by the producer service, store the published content in a forwarding cache of a node within an ICN, receive a content retrieval request from the consumer service, and forward a copy of the stored published content to the consumer service.

Statement 9: A non-transitory computer readable medium stores instructions that, when executed by one or more processors, cause the one or more processors to receive a content production request from a consumer service, forward the content production request to a producer service, receive published content produced by the producer service, store the published content in a forwarding cache of a node within an ICN, receive a content retrieval request from the consumer service, and forward a copy of the stored published content to the consumer service.

Statement 10: A system including one or more processors and a memory storing instructions which, when executed by the one or more processors, cause the system to perform a method according to any of preceding Statements 1-7.

What is claimed is:

1. A method for serving data over an information centric network ("ICN"), the method comprising:
   receiving a content production request from a consumer service;
   forwarding the content production request to a producer service;
   receiving published content produced by the producer service, the published content comprising content produced based on the content production request;
   storing the published content in a forwarding cache of a node within an ICN, wherein the node is an ICN node and is selected to store the published content based on at least one of a first proximity of the node to the producer service or a second proximity of the node to the consumer service, wherein at least one of the first proximity or the second proximity comprises a topological proximity that is based on a topology of the ICN;
   sending, to a plurality of consumer services having a subscription to the producer service, a notification indicating that the published content from the producer service is available;
   after sending the notification, receiving a content retrieval request from the plurality of consumer services; and
   forwarding a copy of the stored published content to the plurality of consumer services.

2. The method of claim 1, further comprising forwarding an acknowledgement message from the producer service to the consumer service.

3. The method of claim 1, further comprising:
   storing the content production request in the forwarding cache of the node;
   receiving a request notification message from the consumer service; and
   forwarding the request notification message to the producer service;
   wherein the content production request is forwarded to the producer service in response to a request from the producer service.

4. The method of claim 1, further comprising:
   receiving a content availability notice from the producer service; and
   forwarding the content availability notice to the consumer service.

5. The method of claim 1, wherein forwarding the copy of the stored published content to the plurality of consumer services comprises asynchronously multicasting the copy of the stored published content to the plurality of consumer services.

6. The method of claim 1, wherein the published content includes an application frame number, and wherein one of the consumer service or the producer service is a microservice within an application.

7. A system for serving data over an information centric network ("ICN"), the system comprising:
one or more processors; and
a memory comprising instructions that, when executed by the one or more processors, cause the one or more processors to:
receive a content production request from a consumer service;
forward the content production request to a producer service;
receive published content produced by the producer service, the published content comprising content produced based on the content production request;
store the published content in a forwarding cache of a node within an ICN, wherein the node is an ICN node and is selected to store the published content based on at least one of a first proximity of the node to the producer service or a second proximity of the node to the consumer service, wherein at least one of the first proximity or the second proximity comprises a topological proximity that is based on a topology of the ICN;
send, to a plurality of consumer services having a subscription to the producer service, a notification indicating that the published content from the producer service is available;
after sending the notification, receive a content retrieval request from the plurality of consumer services; and
forward a copy of the stored published content to the plurality of consumer services.

8. The system of claim 7, wherein the instructions, when executed by the one or more processors, cause the one or more processors to forward an acknowledgement message from the producer service to the consumer service.

9. The system of claim 7, wherein the instructions, when executed by the one or more processors, cause the one or more processors to:
store the content production request in the forwarding cache of the node;
receive a request notification message from the consumer service; and
forward the request notification message to the producer service;
wherein the content production request is forwarded to the producer service in response to a request from the producer service.

10. The system of claim 7, wherein the instructions, when executed by the one or more processors, cause the one or more processors to:
receive a content availability notice from the producer service; and
forward the content availability notice to the consumer service.

11. The system of claim 7, wherein forwarding the copy of the stored published content to the plurality of consumer services comprises multicasting the copy of the stored published content to the plurality of consumer services.

12. The system of claim 7, wherein the published content includes an application frame number, and wherein one of the consumer service or the producer service is a microservice within an application.

13. A non-transitory computer readable medium storing instructions that, when executed by one or more processors, cause the one or more processors to:
receive a content production request from a consumer service;
forward the content production request to a producer service;
receive published content produced by the producer service;
store the published content in a forwarding cache of a node within an ICN, wherein the node is an ICN node and is selected to store the published content based on at least one of a first proximity of the node to the producer service or a second proximity of the node to the consumer service, wherein at least one of the first proximity or the second proximity comprises a topological proximity that is based on a topology of the ICN;
send, to a plurality of consumer services having a subscription to the producer service, a notification indicating that the published content from the producer service is available;
after sending the notification, receive a content retrieval request from the plurality of consumer services; and
forward a copy of the stored published content to the plurality of consumer services.

14. The non-transitory computer readable medium of claim 13, storing instructions that, when executed by one or more processors, cause the one or more processors to forward an acknowledgement message from the producer service to the consumer service.

15. The non-transitory computer readable medium of claim 13, storing instructions that, when executed by one or more processors, cause the one or more processors to:
store the content production request in the forwarding cache of the node;
receive a request notification message from the consumer service; and
forward the request notification message to the producer service;
wherein the content production request is forwarded to the producer service in response to a request from the producer service.

16. The non-transitory computer readable medium of claim 13, storing instructions that, when executed by one or more processors, cause the one or more processors to:
receive a content availability notice from the producer service; and
forward the content availability notice to the consumer service.

17. The non-transitory computer readable medium of claim 13, wherein forwarding the copy of the stored published content to the plurality of consumer services comprises asynchronously multicasting the copy of the stored published content to the plurality of consumer services.

* * * * *